April 13, 1926.
F. T. JONES
TRACTION DEVICE
Filed Oct. 15, 1925
1,580,607
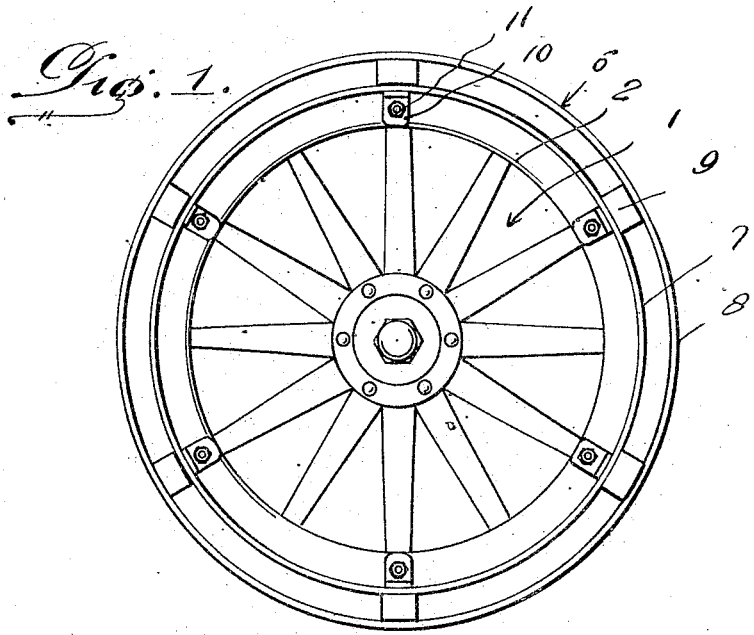
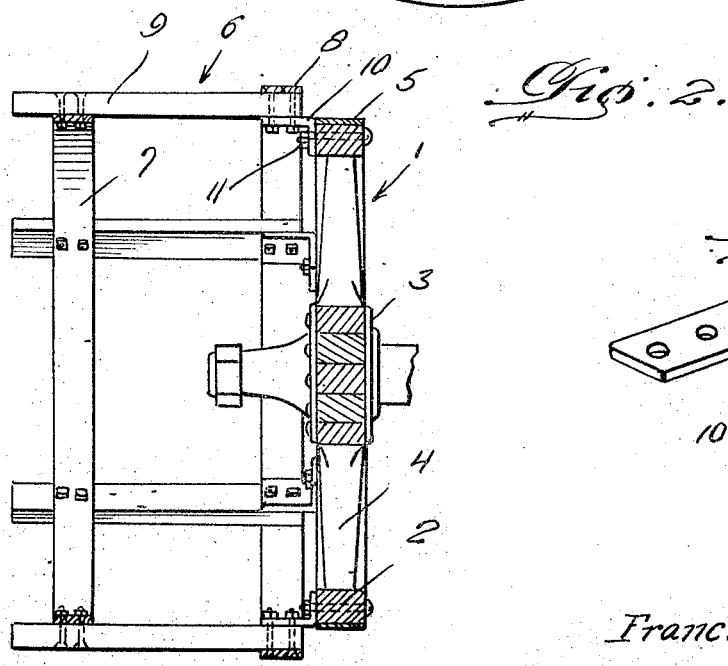
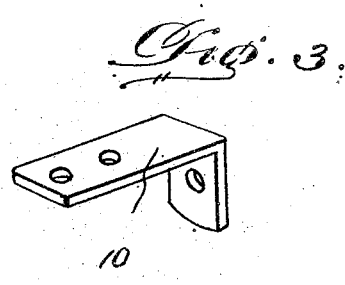
Inventor
Francis T. Jones,
By Clarence A. O'Brien
Attorney Patented Apr. 13, 1926.

1,580,607

UNITED STATES PATENT OFFICE.

FRANCIS T. JONES, OF CRESCO, IOWA.

TRACTION DEVICE.

Application filed October 15, 1925. Serial No. 62,682.

*To all whom it may concern:*

Be it known that I, FRANCIS T. JONES, a citizen of the United States, residing at Cresco, in the county of Howard and State of Iowa, have invented certain new and useful Improvements in a Traction Device, of which the following is a specification.

This invention relates to an improved device for supplying sufficient traction to automobile and truck wheels on snow and mud covered surfaces.

As is well known, it is exceedingly difficult to obtain an efficient propelling traction on ground which is covered with comparatively deep snow or slippery mud. Many kinds of devices have been devised to combat such conditions, the majority of which are in the form of removable tire and wheel chains. These are usually maintained constantly in place on the tire and subject the latter to considerable wear and tear. In fact, the chains themselves wear out quite easily.

What I propose, is a device in the nature of a supplemental wheel attachment which is detachably connected to the felly of the main wheel and is constructed so that its traction surface is normally disposed inwardly of the tread of the tire so as to allow the latter to serve under normal conditions and to bring the traction wheel into service under abnormal conditions.

My principal aim is to generally improve upon devices of this kind by providing one of comparative simplicity and durability which is composed of a pair of inner and outer metal bands connected together by transverse circumferentially spaced traction cleats, together with brackets for connecting the device to the felly of the main wheel.

Other features and advantages of the invention will become apparent from the following description and drawings.

In the accompanying drawing forming a part of this application and in which like numerals are employed to designate like parts throughout the same:—

Figure 1 is a side elevation of a conventional vehicle wheel provided with a traction device constructed in accordance with the present invention, Fig. 2 is a central vertical section through the same.

Fig. 3 is a view of one of the attaching brackets.

Referring to the drawing in detail, the reference character 1 designates a conventional vehicle wheel having an outer felly 2 connected to the hub 3 by spokes 4. If desired the felly may be provided with a metallic rim 5 upon which a conventional pneumatic tire and rim (not shown) may be removably mounted.

In this connection it is to be understood that this kind of a wheel is shown simply for the purpose of illustration and that the invention is applicable to any other type of wheel by simply varying the diameter and arranging the position of the attaching brackets properly.

The supplemental traction attachment is represented generally by the reference character 6. As before intimated, this comprises an outer metal band 7 and an inner metal band 8. It will be noted that the outer band is of a diameter less than the inner band. The bands are connected together by transverse cleats 9 of rectangular cross section which are bolted or otherwise permanently fastened in place. The cleats are arranged at circumferentially spaced points and it will be noted that the band 7 is disposed against the inner faces of the cleats while the band 8 surrounds the outer faces of the cleats. Particular attention is directed to this specific arrangement of the metal bands, because it allows the cleats to serve most efficiently for assuring a tenacious attraction, and at the same time provides a smooth surface running band in having the band 8 on the exterior of the inner end portion of the cleats. In this way, the usual bumping action which would otherwise be present, is substantially eliminated.

The same fastening bolts which serves to connect the band 8 in place, also serve to connect L-shaped attaching brackets 10 to the inner faces of the cleats so that the bolts 11 may be utilized for rigidly fastening the traction attachment to the felly of the main wheel as shown plainly in Fig. 2. It is obvious that when the tire (not shown) is in place, the tread of the same will ordinarily project beyond the traction surface of the attachment. Thus the latter will not come into play until the vehicle is traveling through snow, or mud. In other words, the tire lifts the traction surface of the attachment out of contact with the ground surface, but in event snow or mud is encountered, the tire will sink in sufficiently to allow the traction attachment to come into play.

It is believed that the use and advantages of a device of this kind will be apparent to those skilled in the art after considering the description in connection with the drawings. Therefore a more lengthy description is thought unnecessary.

While the preferred embodiment of the invention has been shown and described, it is to be understood that minor changes coming within the field of invention claimed may be resorted to if desired.

Having thus described my invention, what I claim as new is:—

1. A traction attachment of the class described comprising inner and outer annular bands, transversely extending circumferentially spaced traction cleats connecting said bands together, and attaching brackets.

2. A traction attachment for connection to the outer side of a vehicle wheel comprising inner and outer annular bands, the outer band being of a diameter less than the inner band, transversely extending traction cleats arranged at circumferentially spaced points and connected with said bands, said cleats being connected to the inner surface of the inner band and to the outer surface of the outer band, and attaching brackets connected with the inner end portions of said cleats.

In testimony whereof I affix my signature.

FRANCIS T. JONES.